(12) United States Patent
Zavesky et al.

(10) Patent No.: US 11,595,636 B1
(45) Date of Patent: Feb. 28, 2023

(54) ENHANCED EMOTIVE ENGAGEMENT WITH VOLUMETRIC CONTENT

(71) Applicant: AT&T Intellectual Property I, L.P., Atlanta, GA (US)

(72) Inventors: Eric Zavesky, Austin, TX (US); David Gibbon, Lincroft, NJ (US); Wen-Ling Hsu, Bridgewater, NJ (US); Jianxiong Dong, Pleasanton, CA (US); Richard Palazzo, Stewartsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/408,542

(22) Filed: Aug. 23, 2021

(51) Int. Cl.
| | |
|---|---|
| H04N 13/366 | (2018.01) |
| G06V 20/40 | (2022.01) |
| G06F 3/01 | (2006.01) |
| H04N 13/172 | (2018.01) |
| H04N 13/398 | (2018.01) |
| H04N 13/167 | (2018.01) |

(52) U.S. Cl.
CPC ......... *H04N 13/366* (2018.05); *G06V 20/41* (2022.01); *G06V 20/49* (2022.01); *H04N 13/167* (2018.05); *H04N 13/172* (2018.05); *H04N 13/398* (2018.05); *G06F 3/015* (2013.01); *G06F 2203/011* (2013.01)

(58) Field of Classification Search
CPC .. H04N 13/366; H04N 13/167; H04N 13/172; H04N 13/398; G06V 20/41; G06V 20/49; G06F 3/015; G06F 2203/011
USPC .......................................................... 348/51
See application file for complete search history.

(56) References Cited

U.S. PATENT DOCUMENTS

| | | | |
|---|---|---|---|
| 2017/0280188 A1* | 9/2017 | Mullins | ............. H04N 21/4302 |
| 2020/0005538 A1* | 1/2020 | Neeter | ...................... G06T 7/73 |
| 2020/0211698 A1* | 7/2020 | Douglas | .................. G06T 19/20 |

* cited by examiner

*Primary Examiner* — Tung T Vo
(74) *Attorney, Agent, or Firm* — Hartman & Citrin LLC

(57) ABSTRACT

A volumetric content enhancement system ("the system") can annotate at least a portion of a plurality of voxels from a volumetric video with contextual data. The system can determine at least one actionable position within the volumetric video. The system can create an annotated volumetric video that includes the volumetric video, an annotation with the contextual data, and the at least one actionable position. The system can provide the annotated volumetric video to a volumetric content playback system. The system can obtain viewer feedback associated with the viewer and can determine an emotional state of the viewer based, at least in part, upon the viewer feedback. The system can receive viewer position information that identifies a specific actionable position of the viewer. The system can generate manipulation instructions to instruct the volumetric content playback system to manipulate the annotated volumetric content to achieve a desired emotional state of the viewer.

20 Claims, 9 Drawing Sheets

ENHANCED EMOTIVE ENGAGEMENT WITH VOLUMETRIC CONTENT

BACKGROUND

Volumetric video capture technology uses an array of cameras to capture video of a three-dimensional space, object, or environment. A user can view the volumetric video on a two-dimensional screen or in three-dimensions using an extended reality ("XR") headset, such as augmented reality ("AR") or virtual reality ("VR"), to further enhance the experience. The user can change their viewpoint to view the volumetric video from any angle. For example, in a volumetric video of a concert, the user may change their viewpoint from a fan in the crowd to a musician on stage. In addition to different angles, the user can zoom in and out to further enhance their experience with an increased sense of immersion.

As content is captured in rich media formats like volumetric video that incorporates three-dimensional spatial positions, the emotions experienced by the user may be different depending on how the content is consumed. For example, the user may change their viewpoint such that their distance from a three-dimensional object may change the audio and visual responses from the content. In another example, the user may experience different emotions based upon their viewpoint of the same scene or as a different character within the scene. Automated processing can modulate and enhance the video and/or audio in an attempt to provide a stronger or more subdued emotional impact on the user. It is a daunting task for content creators to determine and plan for all of the potential emotional states that users may experience versus their placement within the volumetric content. For this reason, the advantages of volumetric content over traditional content cannot be fully realized with current implementations, and in some instances, may detract from the user's immersion.

SUMMARY

Concepts and technologies disclosed herein are directed to providing enhanced emotive engagement with annotated volumetric content. According to one aspect of the concepts and technologies disclosed herein, a volumetric content enhancement system can include a processor and a memory. The memory can include instructions that, when executed by the processor, cause the processor to perform operations. In particular, the volumetric content enhancement system can receive a volumetric video from a volumetric content capture system. The volumetric content enhancement system can partition the volumetric video into a plurality of video frames. The volumetric content enhancement system can analyze the plurality of video frames to identify a plurality of voxels. In some embodiments, the portion of the plurality of voxels includes a region. The region can identify a character or an object depicted in the volumetric video. The volumetric content enhancement system can annotate at least a portion of the plurality of voxels with an annotation. The annotation can include contextual data about the portion of the plurality of voxels. The volumetric content enhancement system can determine at least one actionable position within the volumetric video. The volumetric content enhancement system can create an annotated volumetric video that includes the volumetric video, the annotation, and the at least one actionable position. The volumetric content enhancement system can provide the annotated volumetric video to a volumetric content playback system. The volumetric content enhancement system can probe the volumetric content playback system to obtain playback system information that identifies the volumetric content playback system. The volumetric content enhancement system can obtain viewer feedback associated with the viewer. The volumetric content enhancement system can determine an emotional state of the viewer based, at least in part, upon the viewer feedback, can receive viewer position information from the volumetric content playback system. The viewer position information can identify a specific actionable position of the at least one actionable position included in the annotated volumetric video. The volumetric content enhancement system can generate manipulation instructions to instruct the volumetric content playback system to manipulate the annotated volumetric content to achieve a desired emotional state of the viewer. The manipulation instructions can be based, at least in part, upon the viewer feedback, the emotional state, and the viewer position information. The volumetric content enhancement system can provide the manipulation instructions to the volumetric content playback system.

In some embodiments, the volumetric content enhancement system can initialize the emotional state of the viewer of the annotated volumetric video. The volumetric content enhancement system can initialize the emotional state of the viewer to a default emotional state (e.g., neutral). The volumetric content enhancement system can initialize the emotional state based upon other data such as watch history, biometric data from one or more sensors, demographic data, social media data, a combination thereof, and/or the like.

In some embodiments, the viewer feedback can include explicit feedback provided by the viewer. For example, the viewer may describe their emotional state using natural language (e.g., made me feel happy, sad, fear, etc.) or a ranking system such as a number scale (e.g., 1-10) or a letter grade (e.g., A, B, C, D, and F). Other formats of the viewer feedback such as emoji are contemplated. In some embodiments, the viewer feedback can include passive feedback in the form of data from one or more sensors. The sensor(s) can be or can include one or more biometric sensors designed to measure biometric feedback such as galvanic skin response ("GSV"), heart rate, eye movement, facial expressions, and the like. The viewer feedback can be aggregated to include both explicit and passive feedback or the different types of feedback can be provided separately.

The volumetric content enhancement system can generate viewer guidance instructions to instruct the viewer to change from the specific actionable position to a different actionable position. The viewer guidance instructions can suggest which of the currently available actionable positions the viewer should choose for the most immersive experience. The viewer feedback can include information about whether the viewer accepted the viewer guidance instructions, and if not, what the viewer did instead. This information can be used to refine the potential effectiveness of future viewer guidance instructions.

The volumetric content enhancement system can obtain new viewer feedback associated with the viewer. The new viewer feedback can be used by the volumetric content enhancement system to reassess the emotional state of the viewer based, at least in part, the new viewer feedback.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein describe a system that can perform a novel analysis of volumetric video content to determine its emotive impact on viewers. This analysis can be based upon historical examples, input from content creators, viewer feedback, or some combination thereof. Based upon this analysis, viewer position and the corresponding context within the volumetric video can be determined to facilitate stronger emotional connections to the content narrative. The system can analyze and annotate voxels or groups of voxels (referred to herein as "regions") with annotations that provide contextual data about the voxels or regions. The system can also provide automated assistance to determine viewpoints based upon a desired emotive impact. The system can assist in identifying viewpoints that should be restricted, such as viewpoints that are obstructed (e.g., under a table or behind an actor), dramatically insignificant (e.g., looking at a wall), or even detrimental to the content narrative. Viewpoints determined by the system can be used by creators and/or viewers to further enhance the volumetric content. Moreover, the system can enhance or otherwise manipulate static content based upon the current emotive alignment of the user with the volumetric content to provide more dynamic and personalized user experiences.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
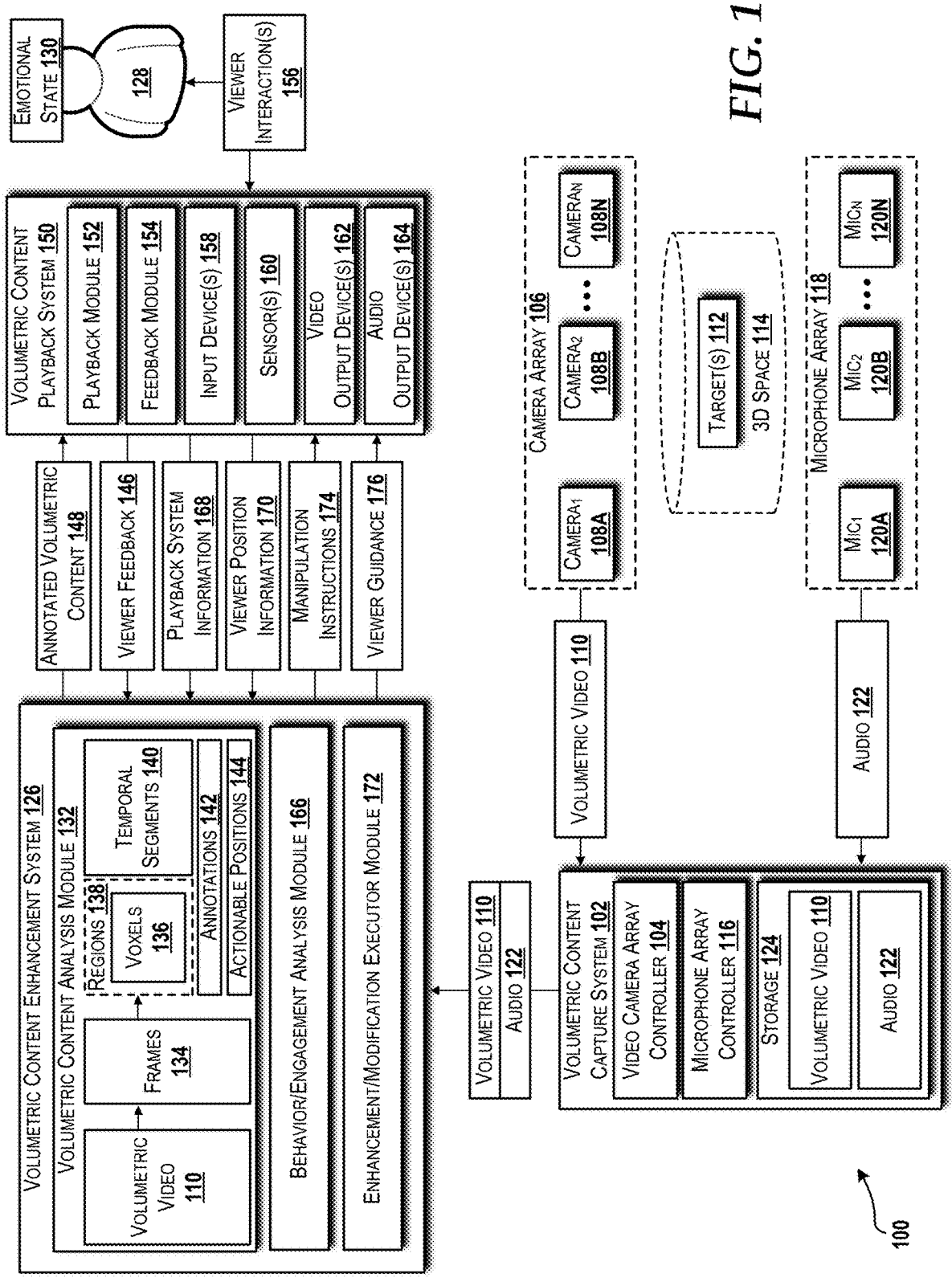
FIG. 1 is a block diagram illustrating aspects of an illustrative operating environment for various concepts and technologies disclosed herein.

Turning now to FIG. 1, aspects of an operating environment 100 for various embodiments of the concepts and technologies disclosed herein will be described according to an illustrative embodiment. The operating environment 100 includes a volumetric content capture system 102. The volumetric content capture system 102 can include a video camera array controller 104 to control a camera array 106 of a plurality of video cameras 108A-108N (hereafter referred to collectively as "cameras 108" or individually as "camera 108") to capture a volumetric video 110 of one or more targets 112 within a three-dimensional space ("3D") space 114. The target(s) 112 generally can be or can include, alone or in any combination, one or more people, one or more places, or one or more objects. For purposes of explanation, and not limitation, the target(s) 112 will be described as actors, props, sets, other participants, and/or other components on a movie, television, or other production set. Alternatively, the target(s) 112 may be athletes participating in a sport such as American football, basketball, hockey, or soccer. The 3D space 114 can be any space in which the target(s) 112 are at least partially located (in position and/or time) during the capture of the volumetric video 110. The borders of the 3D space 114 can be defined, at least in part, by the position of the cameras 108 around the target(s) 112.

Figure 4:
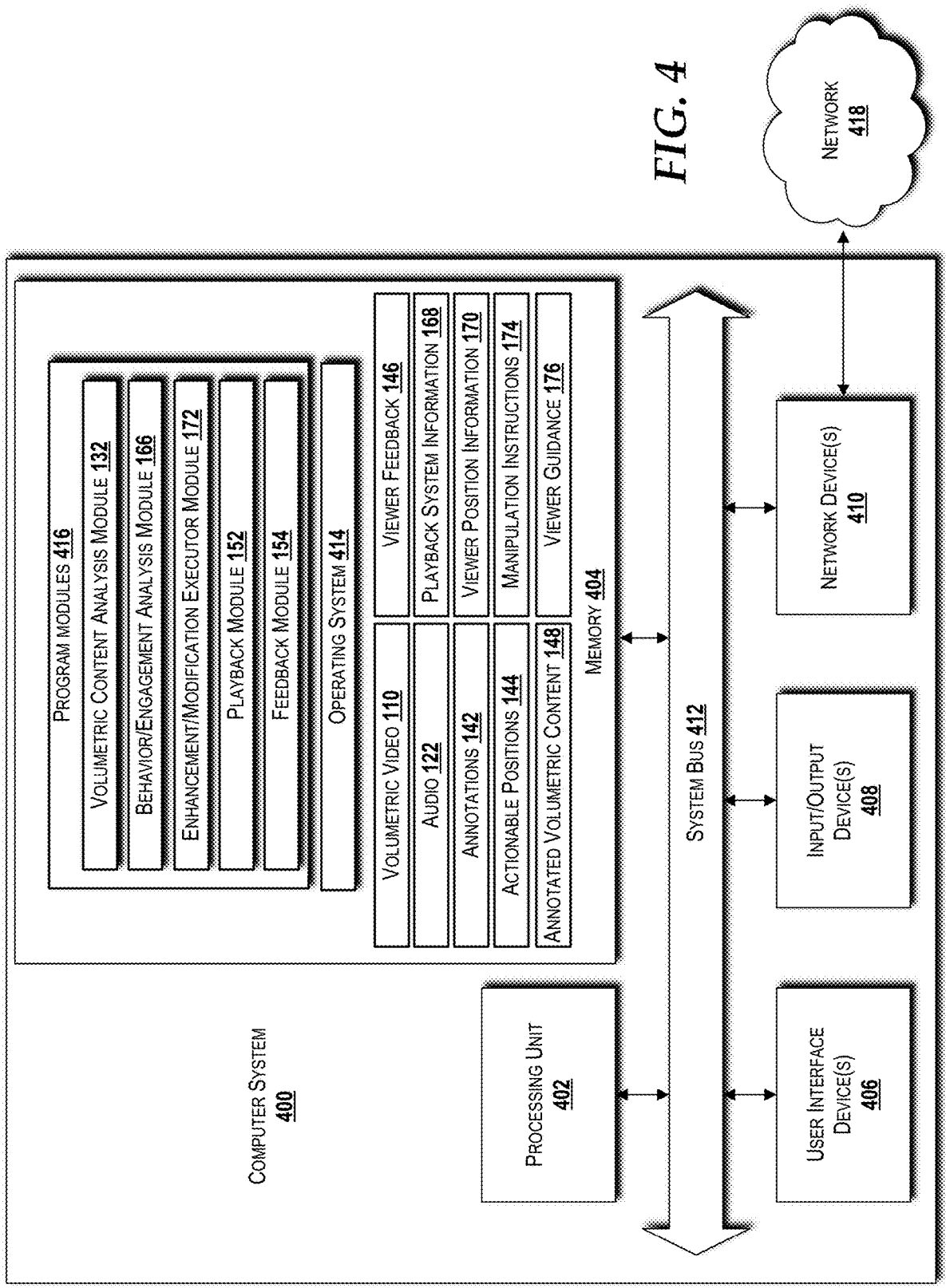
FIG. 4 is a block diagram illustrating an example computer system capable of implementing aspects of the concepts and technologies disclosed herein.

The volumetric content capture system 102 can be embodied as a standalone computing system, an example architecture of which is illustrated and described herein with reference to FIG. 4. As a standalone computing system, the volumetric capture system 102 can communicate with the cameras 108 via wired (e.g., universal serial bus ("USB"), Ethernet, proprietary technology, a combination thereof, or the like) and/or wireless (e.g., Institute of Electrical and Electronics Engineers ("IEEE") 802.11 wireless local area network ("WLAN"), BLUETOOTH, other RF-based technology, a combination thereof, or the like). Alternatively, the volumetric content capture system 102 can be embodied as a network of multiple computing systems that each contain at least one of the cameras 108, in which case one of the computing systems can be designated the master system and the other systems can be designated the slave systems. In some embodiments, this network includes multiple mobile devices such as smartphones, an example architecture of which is illustrated and described herein with reference to FIG. 5.

The video camera array controller 104 can be implemented in hardware, software, or both. The video camera array controller 104 can instruct the cameras 108 regarding when to begin and when to end recording the volumetric video 110 to ensure the cameras 108 are synchronized in time. Moreover, the video camera array controller 104 can provide each of the cameras 108 with values for settings such as frame rate, shutter speed, ISO, white balance, and aperture. It may be desirable to disable certain camera settings such as auto-focus to avoid incongruous video that negatively affects the intention of the volumetric video 110. To that end, the cameras 108 can be designed or configured to ensure each of the cameras 108 uses a lens that has the same focal length. In some embodiments, the video camera array controller 104 can also control lighting in and/or around the 3D space 114 to ensure the target(s) 112 are properly illuminated such as to avoid hotspots and spotlights. This is to ensure that the target(s) 112 appear consistently illuminated during playback of the volumetric video 110. Alternatively, the lighting may be controlled by a separate lighting controller that may or may not be part of the volumetric content capture system 102. Manual lighting control is also contemplated.

In addition to capturing the volumetric video 110, the volumetric content capture system 102 can utilize a microphone array controller 116 to control a microphone array 118 of a plurality of microphones 120A-120N (hereafter referred to collectively as "microphones 120" or individually as "microphone 120") to capture audio 122 of one or more targets 112 within the 3D space 114. In some embodiments, the audio 122 is or includes volumetric audio that corresponds to the volumetric video 110 captured by the cameras 108. For example, the microphone$_1$ 120A may be associated with the camera$_1$ 108A, the microphone$_2$ 120B may be associated with the camera$_2$ 108B, and the microphone$_N$ 120N may be associated with the camera$_N$ 108N. Independent capture of the audio 122, such as in a sound studio, is also contemplated.

The volumetric content capture system 102 can store the volumetric video 110 and the audio 122 in a storage component ("storage") 124. The storage 124 can utilize any data storage technology, some examples of which include, but are not limited to, solid state, optical, and magnetic. In addition, or as an alternative, the volumetric content capture system 102 can cause the volumetric video 110 and/or the audio 122 to be stored in a remote storage component (not shown) such as cloud-based storage.

Those skilled in the art will appreciate the numerous configurations and applications of volumetric content capture equipment, such as the volumetric content capture system 102, the camera array 106, and the microphone array 118. Accordingly, the illustrated example should be construed as one non-limiting example of volumetric content capture equipment that can be used to capture volumetric content to be enhanced by the concept and technologies disclosed herein.

The volumetric content capture system 102 can provide the volumetric video 110 and the audio 122 to a volumetric content enhancement system 126. The volumetric content enhancement system 126 can manipulate the volumetric video 110 and/or the audio 122 to enhance the emotive engagement experienced by one or more viewers 128 (hereafter referred to collectively as "viewers 128" or individually as "viewer 128"). More particularly, the volumetric content enhancement system 126 can manipulate the volumetric video 110 and/or the audio 122 to influence an emotional state 130 of the viewer 128 for a more immersive experience. Although a primary use case described herein is to facilitate a more immersive experience, some viewers 128 may desire a less immersive experience. The volumetric content enhancement system 126 can also manipulate the volumetric video 110 and/or the audio 122 to influence the emotional state 130 of the viewer 128 for a less immersive experience. Accordingly, what constitutes an enhanced immersive experience can be dependent upon the individual desires of the viewers 128.

The emotional state 130 can be representative of one or more emotions experienced by the viewer 128. The viewer 128 may experience happiness, sadness, fear, disgust, anger, surprise, or a combination of emotions, for example. Manipulation of the volumetric video 110 and/or the audio 122 can be used to influence the emotional state 130 of the viewer 128 by targeting the emotion(s) experienced by the viewer 128 and/or the intensity with which the viewer 128 experiences the emotion(s). It is acknowledged that the emotions or intensity thereof as experienced by one viewer 128 may differ from the emotions or intensity thereof as experienced by another viewer 128. The concepts and technologies disclosed herein can be used to manipulate the volumetric video 110 and/or audio 122 in ways so as to accommodate how different viewers 128 may respond emotionally. For example, if the viewer 128 is autistic, the manipulation of the volumetric video 110 and/or the audio 122 may be specifically directed to elicit a particular emotional response that would not be achievable otherwise. As another example, the viewer 128 may experience fear more frequently than the average viewer, and accordingly, the manipulation of the volumetric video 110 and/or the audio 122 can be used to change the viewpoint (e.g., a viewpoint that avoids a scary character) to lessen the intensity with which the viewer 128 experiences the fear emotion. Conversely, the manipulation of the volumetric video 110 and/or the audio 122 can be used to intensify the emotional response of the viewer 128. For example, the volumetric video 110 may contain a battle scene in which multiple characters are fighting, and the original version of the battle scene may include close-up shots of a main character engaged in combat interspersed with wide view shots of the entire battle. While the wide view shots of the entire battle provide a reprieve from the intensity of the battle for some viewers 128, other viewers 128 may desire a more intense experience. As such, the viewpoint may be changed to stay with the main character throughout the battle. The accompanying audio 122 can be changed to better synchronize with the new viewpoint within the volumetric video 110. In other words, the original audio 122 that is associated with a wide view shot may be designed to sound distant and therefore would not correctly correspond to the new viewpoint that instead should be accompanied by close sounds. The volumetric content enhancement system 126 can manipulate the audio 122 to better correspond to the volumetric video 110 when viewed from the new viewpoint.

The volumetric content enhancement system 126 can include one or more modules that can be implemented in hardware, software, firmware, or a combination thereof. In the illustrated example, the volumetric content enhancement system 126 includes distinct modules, but these two or more of these modules may be combined. Moreover, the volumetric content enhancement system 126 may include multiple sub-systems, each of which is configured to execute one or more modules. For purposes of explanation, and not limitation, the modules will be described as software modules that can be executed by one or more processing components (best shown in FIG. 4) of the volumetric content enhancement system 126.

The volumetric content enhancement system 126 can receive the volumetric video 110 and the audio 122 from the volumetric content capture system 102. In some embodiments, the volumetric content capture system 102 can provide the volumetric video 110 and the audio 122 to the volumetric content enhancement system 126 as part of a post-processing procedure. As such, the volumetric content enhancement system 126 may be part of or in communication with an editing system (not shown) that is used by a content creator, editor, or the like. In some embodiments, one or more of the software modules shown as part of the volumetric content enhancement system 126 may be implemented as part of an editing software suite. In some embodiments, the volumetric content enhancement system 126 can request the volumetric video 110 and the audio 122 from the storage 124 as needed, periodically, or based upon a schedule.

The volumetric content enhancement system 126 can execute a volumetric content analysis module 132 to partition the volumetric video 110 into a plurality of volumetric video frames 134 (shown as "frames 134"). A traditional two-dimensional video includes a plurality of two-dimensional frames that each consist of an array of pixels that collectively represent a static image. When the two-dimensional video is played, the two-dimensional frames are played in time order and appear to the viewer as moving images. For volumetric video, the frames 134 are three-dimensional and include an array of voxels 136 (shown as "voxels 136") or otherwise known as three-dimensional pixels. When the volumetric video 110 is played, the frames 134 are played in time order and appear to the viewer as moving images in three dimensions. The volumetric content enhancement system 126 can analyze the frames 134 to identify the voxels 136. Although analysis at the per-voxel level is contemplated, the volumetric content analysis module 132 can identify regions 138 that contain multiple voxels 136. For example, a region 138 may include all the voxels 136 that are representative of a character. The volumetric content analysis module 132 can annotate the voxels 136 as belonging to a specific region 138, such as a specific character in the foregoing example. Moreover, the volumetric content analysis module 132 can annotate the voxels 136 with a temporal segment 140. Since it is likely that the voxels 136 will be represented throughout multiple frames 134, the temporal segment 140 can define a time period during which voxels 136 (or the associated region 138) are present. The voxels 136 may be associated with multiple temporal segments 140 such as to accommodate non-sequential parts of the volumetric video 110 that each include the voxels 136.

The volumetric content analysis module 132 can annotate the voxels 136, the regions 138, or both with additional information shown as annotations 142. For ease of explanation, the annotations 142 will be described as being associated with the regions 138, although the annotations 142 may be associated with the voxels 136 individually. The annotations 142 can include contextual data about the regions 138. The annotations 142 can associate specific scenes and semantics with the regions 138, which can be defined based upon start time and end time stamps within the volumetric video 110. In some embodiments, the volumetric content analysis module 132 can utilize semantic classification concepts and technologies to classify scenes as dialog, suspense, action, or some other classification. The annotations 142 can identify the scenes with tags/labels according to the classifications.

The volumetric content analysis module 132 can utilize other factors to determine the annotations 142. In some embodiments, the volumetric content analysis module 132 can utilize narrative input such as a script or director's notes/commentary to help determine the annotations 142. Analysis of a main view (e.g., default or original view) of the volumetric video 110 can be used to determine actors, objects, and various other contexts within and/or between scenes. Static inferences from the environment, time, landmarks, and the like depicted in the volumetric video 110 can also be used for additional annotations 142 and/or to refine existing annotations 142. The annotations 142 can provide a general sentiment depicted in the volumetric video 110, the audio 122, or both.

The volumetric content analysis module 132 can associate the annotations 142 hierarchically with an entire scene, individual actors within a scene, individual objects within a scene, or the respective regions(s) 138 or voxels 136. The annotations 142 can identify position, time stamp, and orientation.

The volumetric content analysis module 132 can determine one or more actionable positions 144 within the volumetric video 110. The actionable positions 144 are viewpoints from which the viewers 128 are permitted to view the volumetric video 110. If the viewers 128 are permitted to view the volumetric video 110 from any viewpoint, it is likely that the viewers 128 will have a worse viewing experience. It should be understood, however, that some implementations of the concepts and technologies disclosed herein can provide unrestricted viewpoints so that the viewers 128 can view the volumetric video 110 in any way they choose. Although these implementations are possible, the viewers 128 may not fully benefit from the concepts and technologies disclosed herein.

The actionable positions 144 can include one or more default viewpoints. A default viewpoint can be a viewpoint defined by a content creator. For example, a theatrical release of a movie may have numerous default viewpoints so that the movie can be watched as intended by the creator(s). Default viewpoints may not take full advantage of the various viewpoints possible in the volumetric video 110, but can serve as a way for the viewer 128 to view the volumetric video 110 as originally intended and to reset their viewpoint should they choose a viewpoint that is unfavorable. In some embodiments, a default viewpoint can be automatically annotated or discovered based upon the specific camera that was used to capture the view from a particular character's perspective (e.g., the protagonist's viewpoint). For example, if the camera 108A from the camera array 106 was used to capture the protagonist's viewpoint, the volumetric video 110 captured from the camera 108A can be annotated as the default viewpoint. Similarly, a default viewpoint may be established from a dialog or conversation following a specific character or sound, as captured, for example, by a specific microphone from the microphone array 118.

In some instances, the viewer 128 may change the viewpoint to a position that is too close, too far away, obstructed in some way (e.g., under a table or behind an actor), of insufficient detail, dramatically insignificant, or otherwise detrimental to their viewing experience. In an effort to minimize such viewpoints, the volumetric content analysis module 132 can identify the region(s) 138 or the voxels 136 that lie within these dead zones. Additionally or alternatively, the content creator can explicitly identify one or more restricted viewpoints to prevent the viewers 128 from changing the viewpoint to these compromised positions. In this manner, the viewers 128 are able to view the volumetric video 110 as originally intended but with some freedom to explore the volumetric video 110 in 3D space without detracting from a baseline level of immersion that was intended by the content creator.

The actionable positions 144 can be created by or based upon viewer feedback 146 provided by the viewers 128. The viewer feedback 146 can identify preferences, aversions, and other feedback that can be used to identify viewpoints that are interesting to the viewers 128 and/or viewpoints that are uninteresting or detrimental to the viewing experience (e.g., identification of additional dead zones). In some embodiments, the viewer feedback 146 is provided on a per viewer basis such that the viewer feedback 146 can be applied to other content that the viewer 128 consumes. In other embodiments, the viewer feedback 146 can be aggregated from multiple viewers 128 and can be used to form a consensus regarding desirable and undesirable viewpoints. The viewer feedback 146 can be descriptive such that the viewers 128 identify in natural language the desired viewpoint. For example, a battlefield scene may have multiple viewpoints such as a viewpoint from horseback, another viewpoint from the battlefield, and yet another viewpoint from a commander. As such, the viewers 128 can annotate which of these viewpoints is preferred and/or which of these viewpoints is undesirable and should be avoided. The volumetric content analysis module 132 can identify the regions 138 that are viewable from these viewpoints and consider whether these viewpoints should be considered part of the actionable positions 144. In some instances, the volumetric content analysis module 132 can override default actionable positions 144 (such as those defined by a content creator) based upon the viewer feedback 146.

The volumetric content enhancement system 126 can create annotated volumetric content 148. The annotated volumetric content 148 can include the volumetric video 110, the corresponding audio 122, and the annotations 142 including any actionable positions 144 identified by the volumetric content analysis module 132. The annotations 142 can be provided as metadata associated with the volumetric video 110 and/or audio 122.

The volumetric content enhancement system 126 can provide the annotated volumetric content 148 to a volumetric content playback system 150 through which the viewer 128 can consume the annotated volumetric content 148. It should be understood that the volumetric content enhancement system 126 may send the annotated volumetric content 148 to other systems (not shown) that provide, at least in part, a video service through which the viewer 128 can consume the annotated volumetric content 148 via the volumetric content playback system 150. The video service may provide digital downloads of the annotated volumetric content 148 and/or streaming of the annotated volumetric content 148. In some embodiments, the volumetric content enhancement system 126 is part of the video service.

The volumetric content playback system 150 can include one or more modules that can be implemented in hardware, software, firmware, or a combination thereof. In the illustrated example, the volumetric content playback system 150 includes distinct modules, but these modules may be combined. Moreover, the volumetric content playback system 150 may include multiple sub-systems, each of which is configured to execute one or more modules. For purposes of explanation, and not limitation, the modules will be described as software modules that can be executed by one or more processing components (best shown in FIG. 4) of the volumetric content playback system 150.

The volumetric content playback system 150 can include a playback module 152 that receives the annotated volumetric content 148 from the volumetric content enhancement system 126 (or a video service as the case may be). The playback module 152 can determine, based upon the annotations 142, the actionable positions 144 that are to be made available to the viewer 128. The playback module 152 can provide navigation controls that allow the viewer 128 to explore the annotated volumetric content 148 from the actionable positions 144. The playback module 152 also can provide traditional playback controls such as play, pause, stop, rewind, and fast forward to interact with the annotated volumetric content 148.

The volumetric content playback system 150 also can include a feedback module 154 through which the viewer 128 can provide the viewer feedback 146. The viewer feedback 146 can be provided as real-time feedback, such as while the viewer 128 is viewing the annotated volumetric content 148. The viewer feedback 146 can be provided as post-playback feedback, such as after the viewer 128 has viewed the annotated volumetric content 148. The feedback module 154 can prompt the viewer 128 for the viewer feedback 146, although the viewer 128 may additionally or alternatively provide the viewer feedback 146 unprompted and as desired. While the viewer feedback 146 is described as being associated with the annotated volumetric content 148 in particular, the viewer feedback 146 can encompass aggregated feedback provided by the viewer 128 for multiple annotated volumetric contents 148 (e.g., multiple movies). In this manner, the volumetric content enhancement system 126 can better understand how the viewer 128 likes to view their content. This can be used to generate a viewer profile (not shown) specific to the viewer 128. The actionable positions 144 of a given volumetric video 110 then may be modified to accommodate the preferences of the viewer 128. Global preferences can also be considered, and the actionable positions 144 can be adjusted accordingly.

The viewer 128 can provide the viewer feedback 146 to the volumetric content playback system 150 via viewer interactions 156 with the volumetric content playback system 150. The viewer interactions 156 can be input via one or more input devices 158. Although shown as part of the volumetric content playback system 150, the input device(s) 158 can be separate from and configured to operate in communication (e.g., wireless or wired) with the volumetric content playback system 150. The input devices 158 can enable text input such as via a keyboard or speech-to-text. The input devices 158 can enable selection of pre-defined feedback options through a pointer device such as a mouse, trackball, track pad, controller, or gesture device. The viewer feedback 146 obtained via the input devices 158 can be explicit feedback such as the viewer 128 describing their emotional state 130 using natural language (e.g., made me feel happy, sad, fear, etc.) or a ranking system such as a number scale (e.g., 1-10) or a letter grade (e.g., A, B, C, D, and F). Other formats of the viewer feedback 146 such as emoji are contemplated.

The viewer 128 can passively provide the viewer feedback 146 to the volumetric content playback system 150 via one or more sensors 160. Although shown as part of the volumetric content playback system 150, the sensor(s) 160 can be separate from and configured to operate in communication (e.g., wireless or wired) with the volumetric content playback system 150. The sensor(s) 160 can be or can include one or more biometric sensors designed to measure biometric feedback such as galvanic skin response ("GSV"), heart rate, eye movement, facial expressions, and the like. The viewer feedback 146 can be aggregated to include both explicit and passive feedback or the different types of feedback can be provided separately.

The volumetric content playback system 150 can include one or more video output devices 162. Although shown as part of the volumetric content playback system 150, the video output device(s) 162 can be separate from and configured to operate in communication (e.g., wireless or wired) with the volumetric content playback system 150. The video output device(s) 162 can be one or more displays configured to present the volumetric video 110 portion of the annotated volumetric content 148 and any of the annotations 142 that are made visible to the viewer 128. The display(s) can additionally present other information in a visual form (e.g., user interface elements). The display(s) can use any display technology such as, but not limited to, liquid crystal display ("LCD"), plasma, organic light emitting diode ("OLED"), iterations of these display technologies, other future display technologies, and the like. In some embodiments, the display(s) can be or can include an integrated display, a head-mounted display, an eyeglasses display, a head-up display, an external monitor, a projection system, or a holographic display. In some embodiments, the video output device(s) 162 can be part of an extended reality ("XR") system such as an augmented reality ("AR") system, a virtual reality ("VR") system, or a mixed reality system. In some embodiments, the volumetric content playback system 150 is an XR system. Although the immersion experienced by the viewer 128 can be enhanced through XR, the display(s) can be two-dimensional such as a computer monitor, television, or projector.

The volumetric content playback system 150 can include one or more audio output devices 164. Although shown as part of the volumetric content playback system 150, the audio output device(s) 164 can be separate from and configured to operate in communication (e.g., wireless or wired) with the volumetric content playback system 150. The audio output device(s) 164 can include one or more speakers, amplifiers, crossovers, equalizers, microphones, other audio equipment, or some combination thereof capable of producing the audio 122 to be output for the viewer 128 to hear.

The volumetric content enhancement system 126 can execute a behavior/engagement analysis module 166 to probe the volumetric content playback system 150 to obtain playback system information 168. The playback system information 168 can identify the type of system the volumetric content playback system 150 is, such as, for example, a VR system, an AR system, a television, a monitor, a tablet, or a smartphone. The playback system information 168 can include the make, model, serial number, international mobile equipment identity ("IMEI"), and/or other identifying information about the volumetric content playback system 150. It is contemplated that the behavior/engagement analysis module 166 can have a database or have access to a database that identifies the technical specifications and/or the capabilities of the volumetric content playback system 150 based upon the playback system information 168. Alternatively, the volumetric content playback system 150 can explicitly provide its capabilities in the playback system information 168. The playback system information 168 can be used to ensure that the annotated volumetric content 148 is sent to the volumetric content playback system 150 in a format that can be properly displayed on the video output device(s) 162.

The playback system information 168 can also include location data such as latitude and longitude coordinates obtained from a global positioning system ("GPS") sensor, address information, or other information that can help identify where the volumetric content playback system 150 is located and thereby where the viewer 128 is located when viewing the annotated volumetric content 148. The actionable positions 144 may be changed based upon the location data.

The behavior/engagement analysis module 166 can initialize the emotional state 130 of the viewer 128. That is, the emotional state 130 of the viewer 128 before the annotated volumetric content 148 is played by the volumetric content playback system 150. In some embodiments, the behavior/engagement analysis module 166 can request that the viewer 128 provide a portion of the viewer feedback 146 as part of the initialization process. This portion of the viewer feedback 146 can be provided using similar techniques described above, such as natural language, pre-defined options, ranking, emoji, or the like. The behavior/engagement analysis module 166 can initialize the emotional state 130 as a default emotional state (e.g., neutral). The behavior/engagement analysis module 166 can initialize the emotional state 130 based upon other data such as watch history, biometric data from the sensor(s) 160, demographic data, social media data, a combination thereof, and/or the like.

In another embodiment, the behavior/engagement analysis module 166 can utilize content analysis techniques to initialize or bootstrap the annotations 142 for the annotated volumetric content 148 that do not require any viewer feedback 146. Here, pre-trained machine learning models may identify specific video and/or audio signals (e.g., from the frames 134, the voxels 136, the regions 138, or the temporal segments 140) that typically convey happiness, sadness, fear, compassion, and/or other emotions. In one example, a voxel-based analysis for a model of a human face may detect smiling and waving as a sign of joy or smiling in a fighting scene as a sign of anger or malice. In another example, the audio 122 heard for a specific word with semantic meaning (e.g., "despise," "love," or "escape") associated with a specific region 138 in which soldiers or talking animals may produce the annotations 142 that convey valor or comedic sentiments, respectively.

While the annotated volumetric content 148 is being played by the volumetric content playback system 150, the volumetric content enhancement system 126 can execute the behavior/engagement analysis module 166 to monitor the emotional state 130 of the viewer 128 based upon the viewer feedback 146 (real-time feedback in this instance). Again, as mentioned above, the viewer feedback 146 can be explicit feedback that is based upon the viewer interaction(s) 156 and/or the data collected by the sensor(s) 160. The behavior/engagement analysis module 166 can analyze the viewer feedback 146 to update the emotional state 130 of the viewer 128.

The behavior/engagement analysis module 166 can receive viewer position information 170 from the volumetric content playback system 150. The viewer position information 170 can identify the actionable position 144 from which the viewer 128 is consuming the annotated volumetric content 148. As the viewer 128 changes actionable positions 144, the volumetric content playback system 150 can update the behavior/engagement analysis module 166 to ensure that the behavior/engagement analysis module 166 has the current actionable position 144 from which the viewer 128 is consuming the annotated volumetric content 148.

The behavior/engagement analysis module 166 can provide to an enhancement/modification executor module 172 the current emotional state 130 and the current actionable position of the viewer 128. As the behavior/engagement analysis module 166 receives new viewer feedback 146, the behavior/engagement analysis module 166 can update the emotional state 130 of the viewer 128 and provide the updated emotional state 130 to the enhancement/modification executor module 172.

In consideration of the current emotional state 130, the viewer feedback 146, and the viewer position information 170, the enhancement/modification executor module 172 can generate manipulation instructions 174 directed to the playback module 152 of the volumetric content playback system 150. The enhancement/modification executor module 172 can blend, blur, enhance, and/or distort video and/or audio according to the viewer position information 170. For example, the audio 122 can be muffled or muted if the actionable position 144 of the viewer 128 is too far way; the audio 122 can be enhanced to highlight keywords during dialog among actors if the actionable position 144 of the viewer 128 is closer to the actors; or the audio 122 can be left alone if the actionable position 144 of the viewer 128 is immediately adjacent to the actors or otherwise in a default actionable position. The enhancement/modification executor module 172 can determine how the annotated volumetric content 148 should be manipulated to achieve a desired emotional state 130 of the viewer 128. The enhancement/modification executor module 172 can apply one or more filters based upon preferences defined in a viewer profile and/or allowed by the original content creator. The enhancement/modification executor module 172 can instruct the playback module 152 to add or append content that was originally created (e.g., as part of a director's cut) to further immerse the viewer 128 during portions of the annotated volumetric content 148 that they find desirable. The enhancement/modification executor module 172 can instruct the playback module 152 to add external content to the annotated volumetric content 148. This external content can be sourced from other volumetric video, static images, user-generated content, or the like.

The enhancement/modification executor module 172 can provide viewer guidance instructions 176 to the viewer 128. The viewer guidance instructions 176 can suggest which of the currently available actionable positions 144 the viewer 128 should choose for the most immersive experience. The viewer feedback 146 can include information about whether the viewer 128 accepted the viewer guidance instructions 176, and if not, what the viewer 128 did instead. This information can be used to refine the potential effectiveness of future viewer guidance instructions 176.

Figure 2:
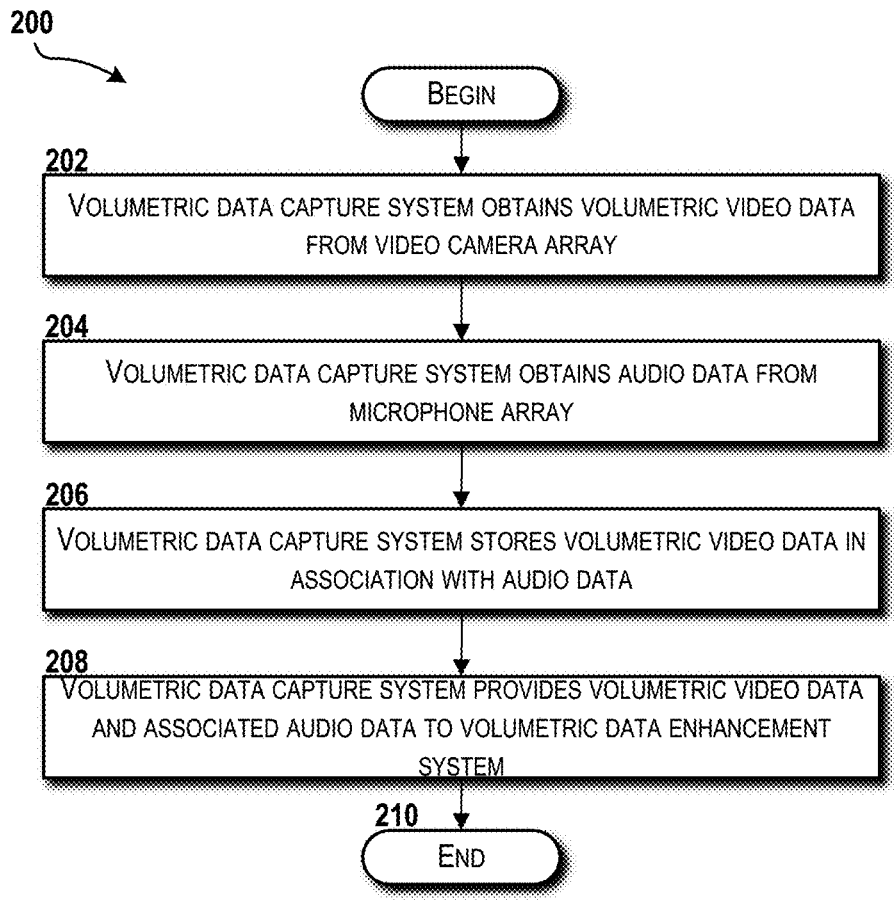
FIG. 2 is a flow diagram illustrating aspects of a method for capturing volumetric content, according to an illustrative embodiment of the concepts and technologies disclosed herein.

Turning now to FIG. 2, a flow diagram illustrating aspects of a method 200 for capturing volumetric content will be described, according to an illustrative embodiment. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the volumetric content capture system 102 obtains the volumetric video 110 from the camera array 106. In particular, the video camera array controller 104 of the volumetric content capture system 102 can instruct the cameras 108 regarding when to begin and when to end recording the volumetric video 110 to ensure the cameras 108 are synchronized in time. Moreover, the video camera array controller 104 can provide each of the cameras 108 with values for settings such as frame rate, shutter speed, ISO, white balance, and aperture. It may be desirable to disable certain camera settings such as auto-focus to avoid incongruous video that negatively affects the intention of the volumetric video 110.

From operation 202, the method proceeds to operation 204. At operation 204, the volumetric content capture system 102 obtains the audio 122 from the microphone array 118. In particular, the microphone array controller 116 of the volumetric content capture system 102 can instruct the microphone array 118 to capture the audio 122 from the microphones 120. In some embodiments, the audio 122 is or includes volumetric audio that corresponds to the volumetric video 110 captured by the cameras 108. For example, the microphone$_1$ 120A may be associated with the camera$_1$ 108A, the microphone$_2$ 120B may be associated with the camera$_2$ 108B, and the microphone$_N$ 120N may be associated with the camera$_N$ 108N. Independent capture of the audio 122, such as in a sound studio, is also contemplated.

From operation 204, the method 200 proceeds to operation 206. At operation 206, the volumetric content capture system 102 stores, in the storage 124, the volumetric video 110 in association with the audio 122. From operation 206, the method 200 proceeds to operation 208. At operation 208, the volumetric content capture system 102 provides the volumetric video 110 and the audio 122 to the volumetric content enhancement system 126. From operation 208, the method 208 proceeds to operation 210. The method 200 can end at operation 210.

Figure 3A:
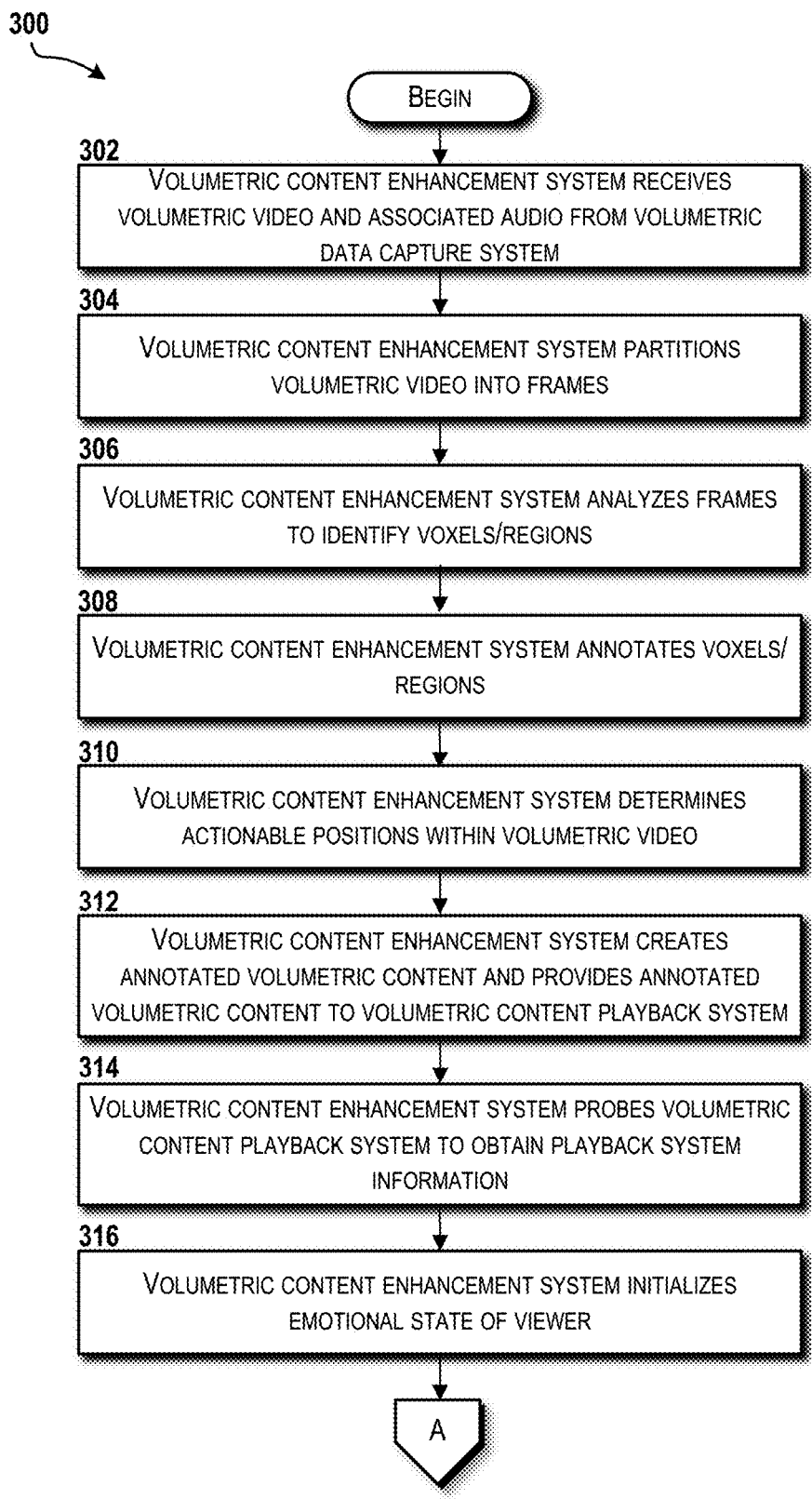
FIGS. 3A and 3B are flow diagrams illustrating aspects of a method for enhancing emotive engagement with annotated volumetric content, according to an illustrative embodiment of the concepts and technologies disclosed herein.
Figure 3B:
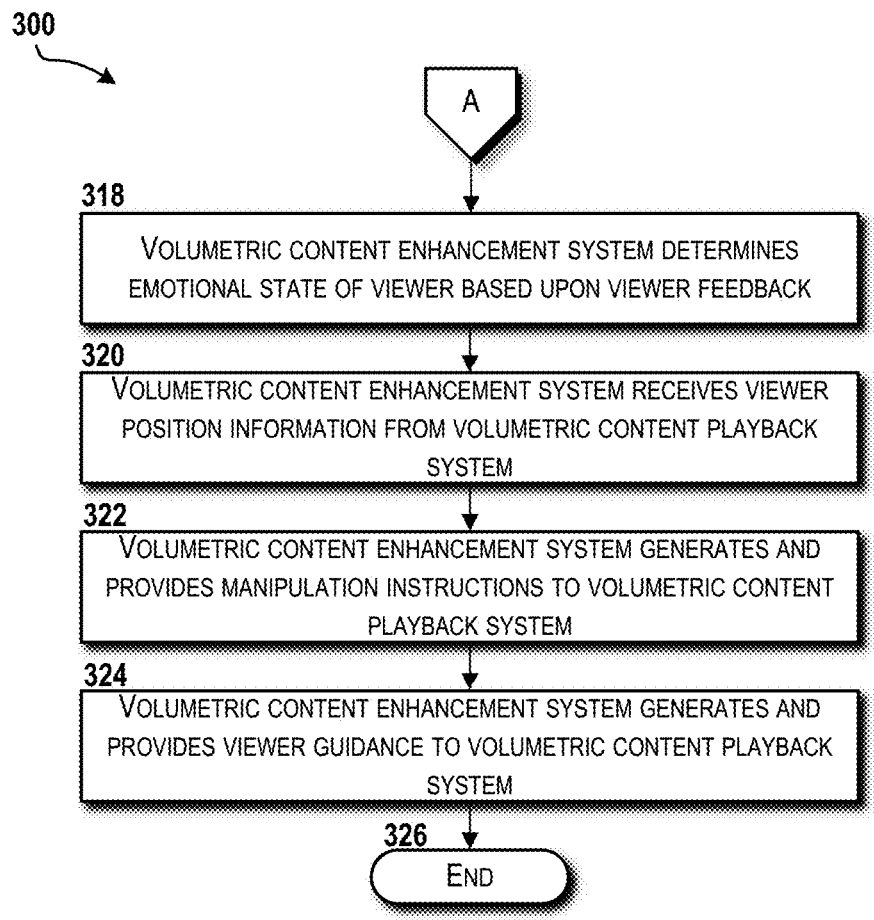

Turning now to FIG. 3, a flow diagram illustrating aspects of a method 300 for enhancing emotive engagement with annotated volumetric content will be described, according to an illustrative embodiment. The method 300 will be described from the perspective of the volumetric content enhancement system 126 executing, via one or more processing components, the volumetric content analysis module 132, the behavior/engagement analysis module 166, and the enhancement/modification executor module 172.

The method 300 begins and proceeds to operation 302. At operation 302, the volumetric content enhancement system 126 receives the volumetric video 110 and the audio 122 from the volumetric content capture system 102. From operation 302, the method 300 proceeds to operation 304. At operation 304, the volumetric content enhancement system 126, via execution of the volumetric content analysis module 132, partitions the volumetric video 110 into the frames 134. From operation 304, the method 300 proceeds to operation 306. At operation 306, the volumetric content enhancement system 126, via execution of the volumetric content analysis module 132, analyzes the frames 134 to identify the voxels 136. Although analysis at the per-voxel level is contemplated, the volumetric content enhancement system 126 can identify the regions 138 that contain multiple voxels 136. For example, a region 138 may include all the voxels 136 that are representative of a character.

From operation 306, the method 300 proceeds to operation 308. At operation 308, the volumetric content enhancement system 126, via execution of the volumetric content analysis module 132, annotates the voxels 136 with the annotations 142. The volumetric content analysis module 132 can annotate the voxels 136 as belonging to a specific region 138, such as a specific character in the foregoing example. Moreover, the volumetric content analysis module 132 can annotate the voxels 136 with the temporal segment 140. Since it is likely that the voxels 136 will be represented throughout multiple frames 134, the temporal segment 140 can define a time period during which the voxels 136 (or the associated region 138) are present. The voxels 136 may be associated with multiple temporal segments 140 such as to accommodate non-sequential parts of the volumetric video 110 that each include the voxels 136.

The annotations 142 can associate specific scenes and semantics with the regions 138, which can be defined based upon start time and end time stamps within the volumetric video 110. In some embodiments, the volumetric content analysis module 132 can utilize semantic classification concepts and technologies to classify scenes as dialog, suspense, action, or some other classification. The annotations 142 can identify the scenes with tags/labels according to the classifications. The volumetric content analysis module 132 can utilize other factors to determine the annotations 142. In some embodiments, the volumetric content analysis module 132 can utilize narrative input such as a script or director's notes/commentary to help determine the annotations 142. Analysis of a main view (e.g., default or original view) of the volumetric video 110 can be used to determine actors, objects, and various other contexts within and/or between scenes. Static inferences from the environment, time, landmarks, and the like depicted in the volumetric video 110 can also be used for additional annotations 142 and/or to refine existing annotations 142. The annotations 142 can provide a general sentiment depicted in the volumetric video 110, the audio 122, or both. The volumetric content analysis module 132 can associate the annotations 142 hierarchically with an entire scene, individual actors within a scene, individual objects within a scene, or the respective regions(s) 138 or voxels 136. The annotations 142 can identify position, time stamp, and orientation.

From operation 308, the method 300 proceeds to operation 310. At operation 310, the volumetric content enhancement system 126, via execution of the volumetric content analysis module 132, determines the actionable positions 144 within the volumetric video 110. The actionable positions 144 are viewpoints from which the viewers 128 are permitted to view the volumetric video 110. If the viewers 128 are permitted to view the volumetric video 110 from any viewpoint, it is likely that the viewers 128 will have a worse viewing experience. It should be understood, however, that some implementations of the concepts and technologies disclosed herein can provide unrestricted viewpoints so that the viewers 128 can view the volumetric video 110 in any way they choose. Although these implementations are possible, the viewers 128 may not fully benefit from the concepts and technologies disclosed herein. The actionable positions 144 can include one or more default viewpoints. A default viewpoint can be a viewpoint defined by a content creator. For example, a theatrical release of a movie may have numerous default viewpoints so that the movie can be watched as intended by the creator(s). Default viewpoints may not take full advantage of the various viewpoints possible in the volumetric video 110, but can serve as a way for the viewer 128 to view the volumetric video 110 as originally intended and to reset their viewpoint should they choose a viewpoint that is unfavorable.

In some instances, the viewer 128 may change the viewpoint to a position that is too close, too far away, obstructed in some way (e.g., under a table or behind an actor), of insufficient detail, dramatically insignificant, or otherwise detrimental to their viewing experience. In an effort to minimize such viewpoints, the volumetric content analysis module 132 can identify the region(s) 138 or the voxels 136 that lie within these dead zones. Additionally or alternatively, the content creator can explicitly identify one or more restricted viewpoints to prevent the viewers 128 from changing the viewpoint to these compromised positions. In this manner, the viewers 128 are able to view the volumetric video 110 as originally intended but with some freedom to explore the volumetric video 110 in 3D space without detracting from a baseline level of immersion that was intended by the content creator.

The actionable positions 144 can be created by or based upon the viewer feedback 146. The viewer feedback 146 can identify preferences, aversions, and other feedback that can be used to identify viewpoints that are interesting to the viewers 128 and/or viewpoints that are uninteresting or detrimental to the viewing experience (e.g., identification of additional dead zones). In some embodiments, the viewer feedback 146 is provided on a per viewer basis such that the viewer feedback 146 can be applied to other content that the viewer 128 consumes. In other embodiments, the viewer feedback 146 can be aggregated from multiple viewers 128 and can be used to form a consensus regarding desirable and undesirable viewpoints. The viewer feedback 146 can be descriptive such that the viewers 128 identify in natural language the desired viewpoint. For example, a battlefield scene may have multiple viewpoints such as a viewpoint from horseback, another viewpoint from the battlefield, and yet another viewpoint from a commander. As such, the viewers 128 can annotate which of these viewpoints is preferred and/or which of these viewpoints is undesirable and should be avoided. The volumetric content analysis module 132 can identify the regions 138 that are viewable from these viewpoints and consider whether these viewpoints should be considered part of the actionable positions 144. In some instances, the volumetric content analysis module 132 can override default actionable positions 144 (such as those defined by a content creator) based upon the viewer feedback 146.

From operation 310, the method 300 proceeds to operation 312. At operation 312, the volumetric content enhancement system 126 creates the annotated volumetric content 148 and provides the annotated volumetric content 148 to the volumetric content playback system 150. The annotated volumetric content 148 can include the volumetric video 110, the corresponding audio 122, and the annotations 142 including any actionable positions 144 identified by the volumetric content analysis module 132. The annotations 142 can be provided as metadata associated with the volumetric video 110 and/or the audio 122. It should be understood that the volumetric content enhancement system 126 may send the annotated volumetric content 148 to other systems (not shown) that provide, at least in part, a video service through which the viewer 128 can consume the annotated volumetric content 148 via the volumetric content playback system 150. The video service may provide digital downloads of the annotated volumetric content 148 and/or streaming of the annotated volumetric content 148. In some embodiments, the volumetric content enhancement system 126 is part of the video service.

From operation 312, the method 300 proceeds to operation 314. At operation 314, the volumetric content enhancement system 126, via execution of the behavior/engagement analysis module 166, probes the volumetric content playback system 150 to obtain the playback system information 168. The playback system information 168 can identify the type of system the volumetric content playback system 150 is, such as, for example, a VR system, an AR system, a television, a monitor, a tablet, or a smartphone. The playback system information 168 can include the make, model, serial number, IMEI, and/or other identifying information about the volumetric content playback system 150. It is contemplated that the behavior/engagement analysis module 166 can have a database or have access to a database that identifies the technical specifications and/or the capabilities of the volumetric content playback system 150 based upon the playback system information 168. Alternatively, the volumetric content playback system 150 can explicitly provide its capabilities in the playback system information 168. The playback system information 168 can be used to ensure that the annotated volumetric content 148 is sent to the volumetric content playback system 150 in a format that can be properly displayed on the video output device(s) 162. The playback system information 168 can also include location data such as latitude and longitude coordinates obtained from a global positioning system ("GPS") sensor, address information, or other information that can help identify where the volumetric content playback system 150 is located and thereby where the viewer 128 is located when viewing the annotated volumetric content 148. The actionable positions 144 may be changed based upon the location data.

From operation 314, the method 300 proceeds to operation 316. At operation 316, the volumetric content enhancement system 126, via execution of the behavior/engagement analysis module 166, initializes the emotional state 130 of the viewer 128 before the annotated volumetric content 148 is played by the volumetric content playback system 150. In some embodiments, the behavior/engagement analysis module 166 can request that the viewer 128 provide a portion of the viewer feedback 146 as part of the initialization process. This portion of the viewer feedback 146 can be provided using similar techniques described above, such as natural language, pre-defined options, ranking, emoji, or the like. The behavior/engagement analysis module 166 can initialize the emotional state 130 as a default emotional state (e.g., neutral). The behavior/engagement analysis module 166 can initialize the emotional state 130 based upon other data such as watch history, biometric data from the sensor(s) 160, demographic data, social media data, a combination thereof, and/or the like.

From operation 316, the method 300 proceeds to operation 318. At operation 318, the volumetric content enhancement system 126, via execution of the behavior/engagement analysis module 166, determines the emotional state 130 of the viewer 128 based upon the viewer feedback 146. The viewer feedback 146 can be explicit feedback that is based upon the viewer interaction(s) 156. The viewer feedback 146 can be passive feedback that is based upon the sensor(s) 160. The behavior/engagement analysis module 166 can analyze the viewer feedback 146 to update the emotional state 130 of the viewer 128.

From operation 318, the method 300 proceeds to operation 320. At operation 320, the volumetric content enhancement system 126 receives the viewer position information 170 from the volumetric content playback system 150. The viewer position information 170 can identify the actionable position 144 from which the viewer 128 is consuming the annotated volumetric content 148. As the viewer 128 changes actionable positions 144, the volumetric content playback system 150 can update the behavior/engagement analysis module 166 to ensure that the behavior/engagement analysis module 166 has the current actionable position 144 from which the viewer 128 is consuming the annotated volumetric content 148. The behavior/engagement analysis module 166 can provide to the enhancement/modification executor module 172 the current emotional state 130 and the current actionable position of the viewer 128. As the behavior/engagement analysis module 166 receives new viewer feedback 146, the behavior/engagement analysis module 166 can update the emotional state 130 of the viewer 128 and provide the updated emotional state 130 to the enhancement/modification executor module 172.

From operation 320, the method 300 proceeds to operation 322. At operation 322, the volumetric content enhancement system 126, via the enhancement/modification executor module 172, generates the manipulation instructions 174 and provides the manipulation instructions 174 to the volumetric content playback system 150. The manipulation instructions 174 can instruct the volumetric content playback system 150 to blend, blur, enhance, and/or distort the video and/or audio of the annotated volumetric content 148 according to the viewer position information 170. For example, the audio 122 can be muffled or muted if the actionable position 144 of the viewer 128 is too far way; the audio 122 can be enhanced to highlight keywords during dialog among actors if the actionable position 144 of the viewer 128 is closer to the actors; or the audio 122 can be left alone if the actionable position 144 of the viewer 128 is immediately adjacent to the actors or otherwise in a default actionable position. The enhancement/modification executor module 172 can determine how the annotated volumetric content 148 should be manipulated to achieve a desired emotional state 130 of the viewer 128. The enhancement/modification executor module 172 can apply one or more filters based upon preferences defined in a viewer profile and/or allowed by the original content creator. The enhancement/modification executor module 172 can instruct the playback module 152 to add or append content that was originally created (e.g., as part of a director's cut) to further immerse the viewer 128 during portions of the annotated volumetric content 148 that they find desirable. The enhancement/modification executor module 172 can instruct the playback module 152 to add external content to the annotated volumetric content 148. This external content can be sourced from other volumetric video, static images, user-generated content, or the like.

From operation 322, the method 300 proceeds to operation 324. At operation 324, the volumetric content enhancement system 126 generates the viewer guidance instructions 176 and provides the viewer guidance instructions 176 to the volumetric content playback system 126. The viewer guidance instructions 176 can suggest which of the currently available actionable positions 144 the viewer 128 should choose for the most immersive experience. In the illustrated method 300, the volumetric content enhancement system 126 can use both the manipulation instructions 174 and the viewer guidance instructions 176 to achieve a desired emotional state 130 of the viewer 128. Alternatively, the volumetric content enhancement system 126 can use either the manipulation instructions 174 or the viewer guidance instructions 176 to achieve a desired emotional state 130 of the viewer 128.

From operation 324, the method 300 proceeds to operation 326. The method 300 can end at operation 326.

The operations described above in context of the method 300 can be repeated as necessary to achieve a desired emotional state 130 of the viewer 128. For example, after the volumetric content enhancement system 126 provides the manipulation instructions 174 to the volumetric content playback system 126, the volumetric content enhancement system 126 can receive new viewer feedback 146 (e.g., explicit and/or passive) and can reassess the emotional state 130 of the viewer 128 based upon the new viewer feedback 146 and provide additional manipulation instructions 174 and/or additional viewer guidance instructions 176 to the volumetric content playback system 126.

Turning now to FIG. 4, a block diagram illustrating a computer system 400 configured to provide the functionality described herein in accordance with various embodiments will be described. In some embodiments, the volumetric content capture system 102 can be configured the same as or similar to the computer system 400. In some embodiments, the volumetric content enhancement system 126 can be configured the same as or similar to the computer system 400. In some embodiments, the volumetric content playback system 150 can be configured the same as or similar to the computer system 400.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can be a single processing unit or a multiple processing unit that includes more than one processing component. Processing units are generally known, and therefore are not described in further detail herein.

The memory 404 communicates with the processing unit 402 via the system bus 412. The memory 404 can include a single memory component or multiple memory components. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, the FREEBSD family of operating systems, the SOLARIS family of operating systems from ORACLE CORPORATION, other operating systems, and the like.

The program modules 416 may include various software and/or program modules described herein. The program modules 416 can include the volumetric content analysis module 132, the behavior/engagement analysis module 166, and the enhancement/modification executor module 172 in an embodiment of the volumetric content enhancement system 126 configured the same as or similar to the computer system 400. The program modules 416 can include the playback module 152 and the feedback module 154 in an embodiments of the volumetric content playback system 150 configured the same as or similar to the computer system 400. In some embodiments, multiple implementations of the computer system 400 can be used, wherein each implementation is configured to execute one or more of the program modules 416. The program modules 416 and/or other programs can be embodied in computer-readable media containing instructions that, when executed by the processing unit 402, perform the method 200 and/or the method 300 described herein. According to embodiments, the program modules 416 may be embodied in hardware, software, firmware, or any combination thereof. The memory 404 also can be configured to store the volumetric video 110, the audio 122, the annotations 142, the actionable positions 144, the annotated volumetric content 148, the viewer feedback 146, the playback system information 168, the viewer position information 170, the manipulation instructions 174, the viewer guidance instructions 176, other data disclosed herein, or a combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. The I/O devices 408 can be or can include the input device(s) 158 and/or the sensor(s) 160. The I/O devices 408 can include the cameras 108, the microphones 120, the video camera array controller 104, the microphone array controller 116, or a combination thereof. Further, the I/O devices 408 may include one or more output devices, such as, but not limited to, the video output device(s) 162 and/or the audio output device(s) 164.

The network devices 410 enable the computer system 400 to communicate with other networks or remote systems via the network(s) 418. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 5:
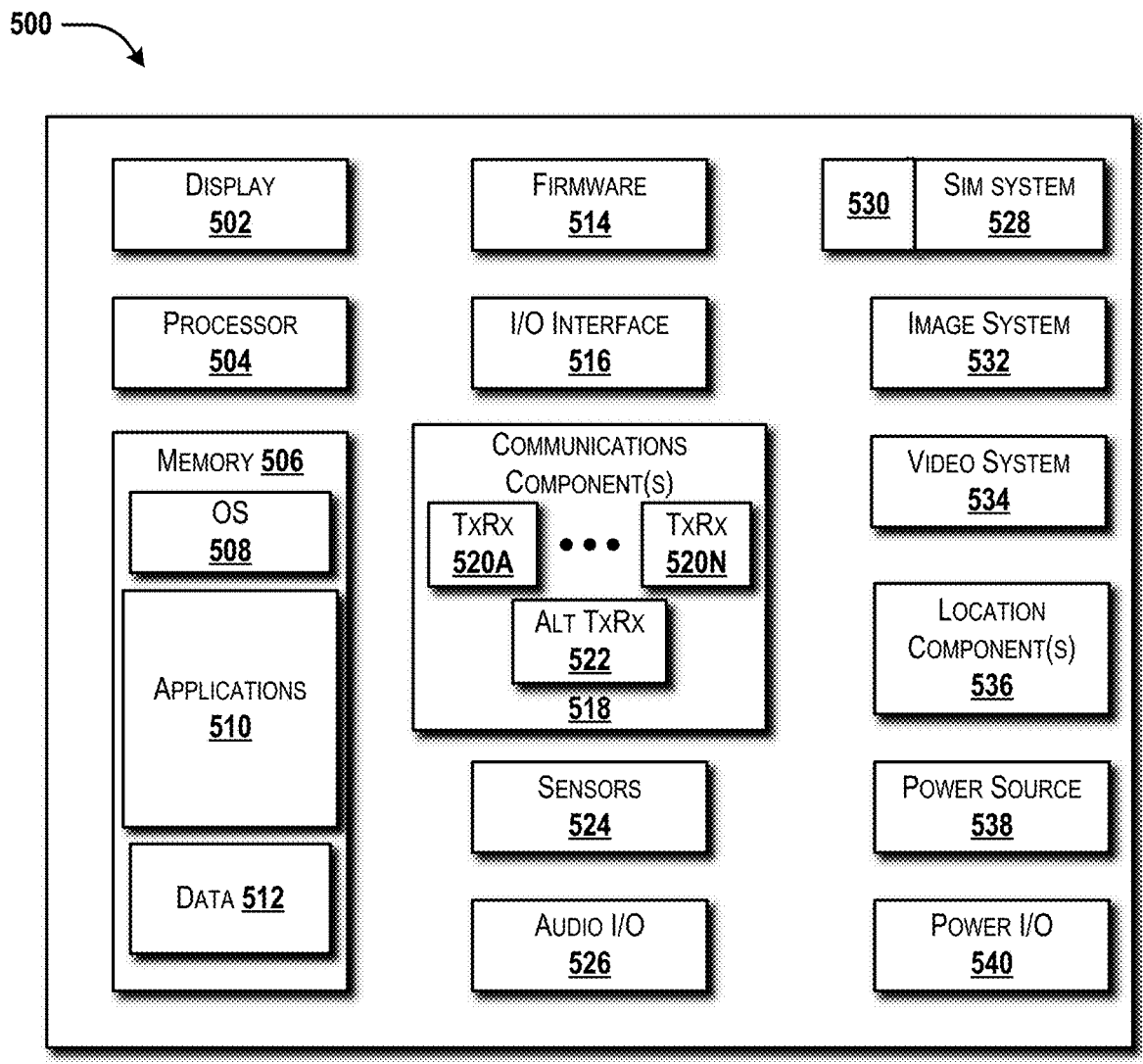
FIG. 5 is a block diagram illustrating an example mobile device capable of implementing aspects of the concepts and technologies disclosed herein.

Turning now to FIG. 5, an illustrative mobile device 500 and components thereof will be described. In some embodiments, the volumetric content capture system 102 can be configured the same as or similar to the mobile device 500. In some embodiments, the volumetric content enhancement system 126 can be configured the same as or similar to the mobile device 500. In some embodiments, the volumetric content playback system 150 can be configured the same as or similar to the mobile device 500. In some embodiments, each of the cameras 108 can be part of a smartphone configured the same as or similar to the mobile device 500. In some embodiments, each of the microphones 120 can be part of a smartphone configured the same as or similar to the mobile device 500.

While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. In some embodiments, the display 502 is or includes the video output device(s) 162. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 can also include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. The applications 510 can include the volumetric content analysis module 132, the behavior/engagement analysis module 166, the enhancement/modification executor module 172, the playback module 152, the feedback module 154, or a combination thereof. In some embodiments, the applications 510 can also include a UI application (not illustrated in FIG. 5). The memory 506 can also store the volumetric video 110, the audio 122, the annotations 142, the actionable positions 144, the annotated volumetric content 148, the viewer feedback 146, the playback system information 168, the viewer position information 170, the manipulation instructions 174, the viewer guidance instructions 176, other data disclosed herein, or a combination thereof.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 can also store code for execution during device power up and power down operations. It can be appreciated that the firmware 514 can be stored in a volatile or non-volatile data storage device including, but not limited to, the memory 506 and/or a portion thereof.

The mobile device 500 can also include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 can also include a communications component 518. The communications component 518 can be configured to interface with the processor 504 to facilitate wired and/or wireless communications with one or more networks, such as the network 418, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 can also include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 can also include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 can also facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 can also include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 can also include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 can also include an image capture and processing system 532 ("image system"). The image system 532 can be configured to capture or otherwise obtain photos, videos, and/or other visual information. As such, the image system 532 can include cameras, lenses, chargecoupled devices ("CCDs"), combinations thereof, or the like. The mobile device 500 may also include a video system 534. The video system 534 can be configured to capture, process, record, modify, and/or store video content. In some embodiments, the video system 534 can be or can include one or more of the cameras 108 configured to capture the volumetric video 110. Photos and videos obtained using the image system 532 and the video system 534, respectively, may be added as message content to an MMS message, email message, and sent to another device. The video and/or photo content can also be shared with other devices via various types of data transfers via wired and/or wireless communication devices as described herein.

The mobile device 500 can also include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 can also be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 can also include a power source 538. The power source 538 can include one or more batteries, power supplies, power cells, and/or other power subsystems including alternating current ("AC") and/or direct current ("DC") power devices. The power source 538 can also interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
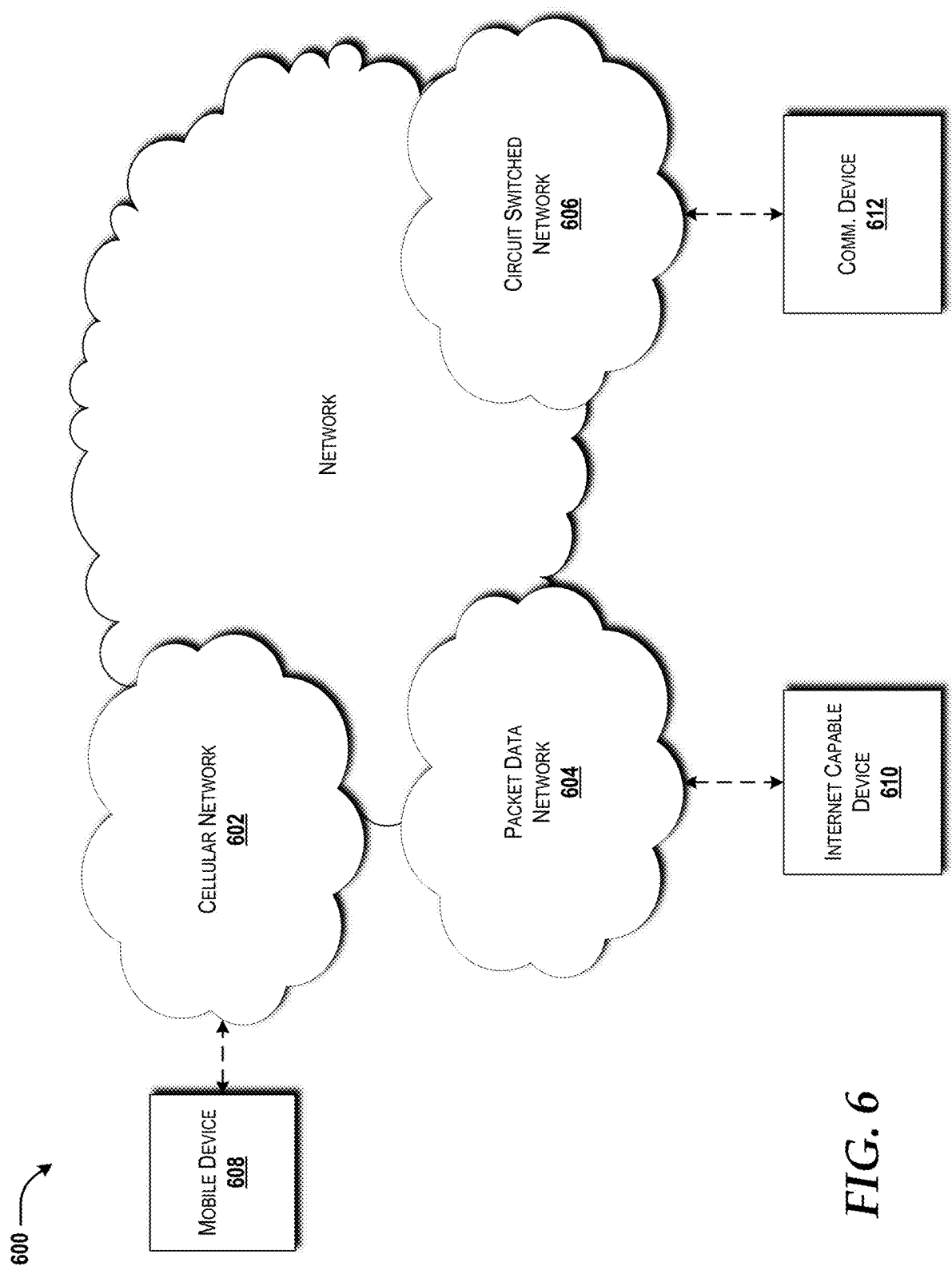
FIG. 6 is a block diagram illustrating an example network capable of implementing aspects of the concepts and technologies disclosed herein.

Turning now to FIG. 6, details of a network 600 are illustrated, according to an illustrative embodiment. The network 600 includes a cellular network 602, a packet data network 604, and a circuit switched network 606 (e.g., a public switched telephone network). The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the mobile device 500, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with mobile communications standards such as LTE, or the like, as well as evolved and future mobile standards.

The packet data network 604 includes various systems, devices, servers, computers, databases, and other devices in communication with one another, as is generally known. The volumetric content capture system 102, the volumetric content enhancement system 126, and the volumetric content playback system 150 can communicate with each other via the packet data network 604. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable systems/devices 610 such as the volumetric content capture system 102, the volumetric content enhancement system 126, and the volumetric content playback system 150, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
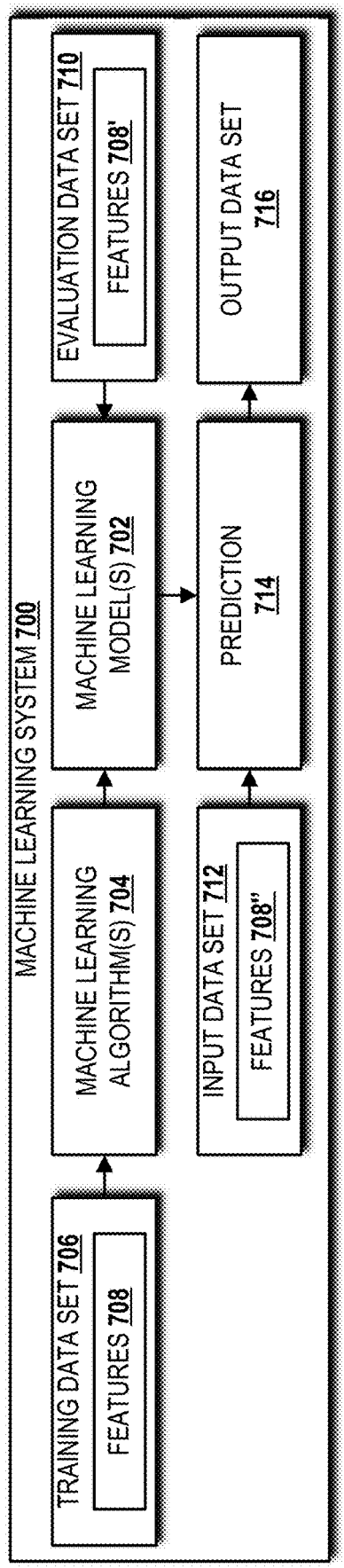
FIG. 7 is a block diagram illustrating an example machine learning system capable of implementing aspects of the concepts and technologies disclosed herein.

Turning now to FIG. 7, a machine learning system 700 capable of implementing aspects of the embodiments disclosed herein will be described. In some embodiments, aspects of the volumetric content capture system 102, the volumetric content enhancement system 126, and/or the volumetric content playback system 150 can be improved via machine learning. Accordingly, the volumetric content capture system 102, the volumetric content enhancement system 126, and/or the volumetric content playback can include or can be in communication with a machine learning system 700.

The illustrated machine learning system 700 includes one or more machine learning models 702. The machine learning models 702 can include, unsupervised, supervised, and/or semi-supervised learning models. The machine learning model(s) 702 can be created by the machine learning system 700 based upon one or more machine learning algorithms 704. The machine learning algorithm(s) 704 can be any existing, well-known algorithm, any proprietary algorithms, or any future machine learning algorithm. Some example machine learning algorithms 704 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 704 based upon the problem(s) to be solved by machine learning via the machine learning system 700.

The machine learning system 700 can control the creation of the machine learning models 702 via one or more training parameters. In some embodiments, the training parameters are selected modelers at the direction of an enterprise, for example. Alternatively, in some embodiments, the training parameters are automatically selected based upon data provided in one or more training data sets 706. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 704 converges to the optimal weights. The machine learning algorithm 704 can update the weights for every data example included in the training data set 706. The size of an update is controlled by the learning rate. A learning rate that is too high might prevent the machine learning algorithm 704 from converging to the optimal weights. A learning rate that is too low might result in the machine learning algorithm 704 requiring multiple training passes to converge to the optimal weights.

The model size is regulated by the number of input features ("features") 708 in the training data set 706. A greater the number of features 708 yields a greater number of possible patterns that can be determined from the training data set 706. The model size should be selected to balance the resources (e.g., compute, memory, storage, etc.) needed for training and the predictive power of the resultant machine learning model 702.

The number of training passes indicates the number of training passes that the machine learning algorithm 704 makes over the training data set 706 during the training process. The number of training passes can be adjusted based, for example, on the size of the training data set 706, with larger training data sets being exposed to fewer training passes in consideration of time and/or resource utilization. The effectiveness of the resultant machine learning model 702 can be increased by multiple training passes.

Data shuffling is a training parameter designed to prevent the machine learning algorithm 704 from reaching false optimal weights due to the order in which data contained in the training data set 706 is processed. For example, data provided in rows and columns might be analyzed first row, second row, third row, etc., and thus an optimal weight might be obtained well before a full range of data has been considered. By data shuffling, the data contained in the training data set 706 can be analyzed more thoroughly and mitigate bias in the resultant machine learning model 702.

Regularization is a training parameter that helps to prevent the machine learning model 702 from memorizing training data from the training data set 706. In other words, the machine learning model 702 fits the training data set 706, but the predictive performance of the machine learning model 702 is not acceptable. Regularization helps the machine learning system 700 avoid this overfitting/memorization problem by adjusting extreme weight values of the features 708. For example, a feature that has a small weight value relative to the weight values of the other features in the training data set 706 can be adjusted to zero.

The machine learning system 700 can determine model accuracy after training by using one or more evaluation data sets 710 containing the same features 708' as the features 708 in the training data set 706. This also prevents the machine learning model 702 from simply memorizing the data contained in the training data set 706. The number of evaluation passes made by the machine learning system 700 can be regulated by a target model accuracy that, when reached, ends the evaluation process and the machine learning model 702 is considered ready for deployment.

After deployment, the machine learning model 702 can perform a prediction operation ("prediction") 714 with an input data set 712 having the same features 708" as the features 708 in the training data set 706 and the features 708' of the evaluation data set 710. The results of the prediction 714 are included in an output data set 716 consisting of predicted data. The machine learning model 702 can perform other operations, such as regression, classification, and others. As such, the example illustrated in FIG. 7 should not be construed as being limiting in any way.

Figure 8:
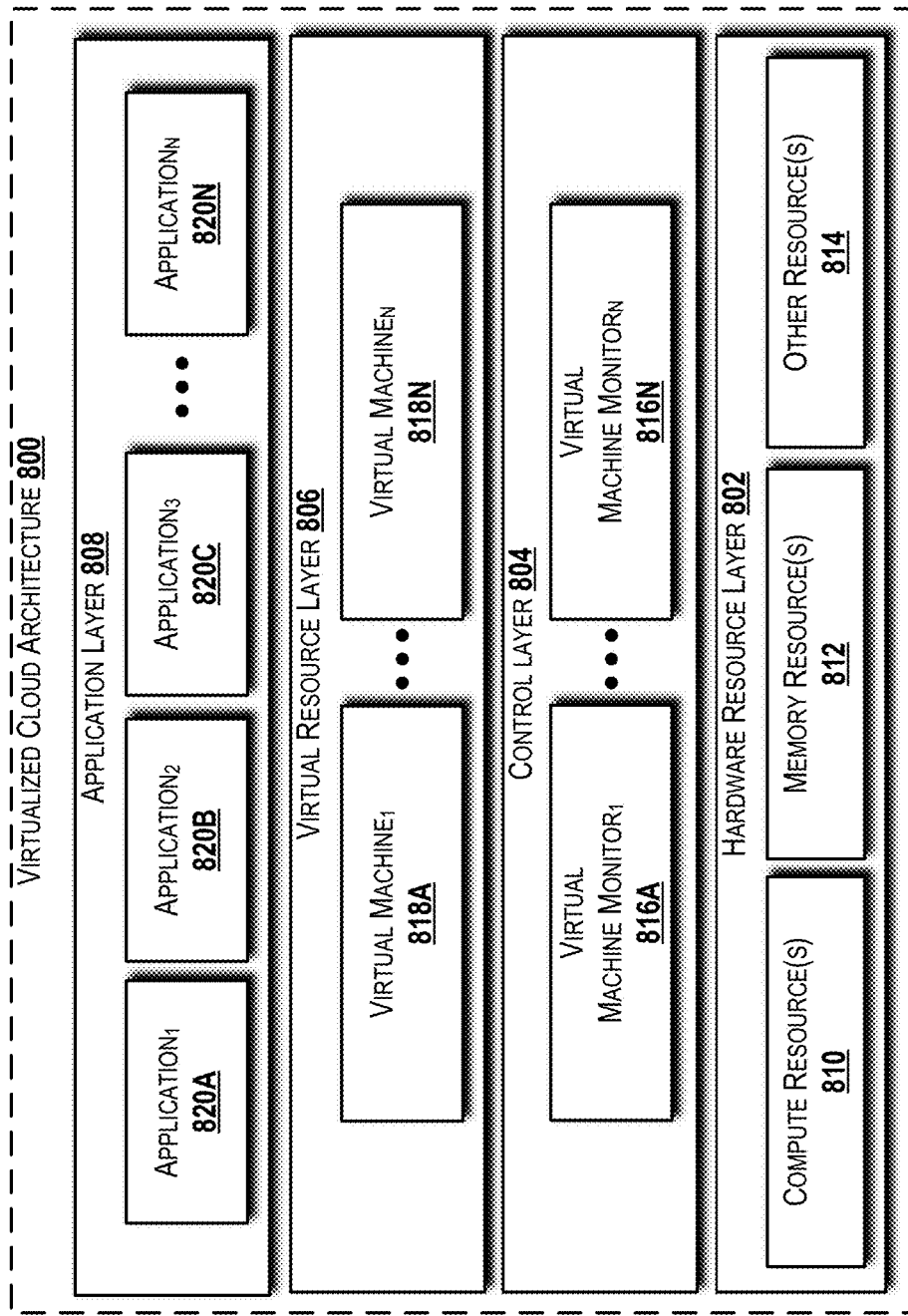
FIG. 8 is a block diagram illustrating a virtualized cloud architecture capable of implementing aspects of the concepts and technologies disclosed herein.

Turning now to FIG. 8, a block diagram illustrating an example virtualized cloud architecture 800 and components thereof will be described, according to an exemplary embodiment. In some embodiments, the virtualized cloud architecture 800 can be utilized to implement, at least in part, the volumetric content capture system 102, the volumetric content enhancement system 126, the volumetric content playback system 150, and/or the network 600 or a portion thereof. The virtualized cloud architecture 800 is a shared infrastructure that can support multiple services and network applications. The illustrated virtualized cloud architecture 800 includes a hardware resource layer 802, a control layer 804, a virtual resource layer 806, and an application layer 808 that work together to perform operations as will be described in detail herein.

The hardware resource layer 802 provides hardware resources, which, in the illustrated embodiment, include one or more compute resources 810, one or more memory resources 812, and one or more other resources 814. The compute resource(s) 810 can include one or more hardware components that perform computations to process data, and/or to execute computer-executable instructions of one or more application programs, operating systems, and/or other software. The compute resources 810 can include one or more central processing units ("CPUs") configured with one or more processing cores. The compute resources 810 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 810 can include one or more discrete GPUs. In some other embodiments, the compute resources 810 can include CPU and GPU components that are configured in accordance with a co-processing CPU/GPU computing model, wherein the sequential part of an application executes on the CPU and the computationally-intensive part is accelerated by the GPU. The compute resources 810 can include one or more system-on-chip ("SoC") components along with one or more other components, including, for example, one or more of the memory resources 812, and/or one or more of the other resources 814. In some embodiments, the compute resources 810 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 810 can be or can include one or more hardware components architected in accordance with an advanced reduced instruction set computing ("RISC") machine ("ARM") architecture, available for license from ARM HOLDINGS. Alternatively, the compute resources 810 can be or can include one or more hardware components architected in accordance with an x86 architecture, such an architecture available from INTEL CORPORATION of Mountain View, Calif., and others. Those skilled in the art will appreciate the implementation of the compute resources 810 can utilize various computation architectures, and as such, the compute resources 810 should not be construed as being limited to any particular computation architecture or combination of computation architectures, including those explicitly disclosed herein.

The memory resource(s) 812 can include one or more hardware components that perform storage operations, including temporary or permanent storage operations. In some embodiments, the memory resource(s) 812 include volatile and/or non-volatile memory implemented in any method or technology for storage of information such as computer-readable instructions, data structures, program modules, or other data disclosed herein. In implementations of the volumetric content capture system 102 on the virtualized cloud architecture 800, the memory resource(s) 812 can contain a software implementation of the video camera array controller 104, a software implementation of the microphone array controller 116, and the storage 124 that includes the volumetric video 110 and the audio 122. In implementations of the volumetric content enhancement system 126 on the virtualized cloud architecture 800, the memory resource(s) 812 can contain the volumetric content analysis module 132, the behavior/engagement analysis module 166, and the enhancement/modification executor module 172. In implementations of the volumetric content playback system 150 on the virtualized cloud architecture 800, the memory resource(s) 812 can contain the playback module 152 and the feedback module 154. The memory resources(s) 812 can also store the volumetric video 110, the audio 122, the annotations 142, the actionable positions 144, the annotated volumetric content 148, the viewer feedback 146, the playback system information 168, the viewer position information 170, the manipulation instructions 174, and the viewer guidance instructions 176.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 810.

The other resource(s) 814 can include any other hardware resources that can be utilized by the compute resources(s) 810 and/or the memory resource(s) 812 to perform operations described herein. The other resource(s) 814 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 802 can be virtualized by one or more virtual machine monitors ("VMMs") 816A-816N (also known as "hypervisors;" hereinafter "VMMs 816") operating within the control layer 804 to manage one or more virtual resources that reside in the virtual resource layer 806. The VMMs 816 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 810, the memory resources 812, the other resources 814, or any combination thereof. These abstractions are referred to herein as virtual machines ("VMs"). In the illustrated embodiment, the virtual resource layer 806 includes VMs 818A-818N (hereinafter "VMs 818"). Each of the VMs 818 can execute one or more applications 820A-820N in the application layer 808.

Based on the foregoing, it should be appreciated that aspects of enhanced emotive engagement with annotated volumetric content have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
creating, by a volumetric content enhancement system comprising a processor, an annotated volumetric video comprising a volumetric video, an annotation, and at least one actionable position;
providing, by the volumetric content enhancement system, the annotated volumetric video to a volumetric content playback system through which a viewer can view the annotated volumetric video;
obtaining, by the volumetric content enhancement system, viewer feedback associated with a viewer;
determining, by the volumetric content enhancement system, an emotional state of the viewer based, at least in part, upon the viewer feedback;
receiving, by the volumetric content enhancement system, viewer position information from the volumetric content playback system, wherein the viewer position information identifies a specific actionable position of the at least one actionable position comprised in the annotated volumetric video;
generating, by the volumetric content enhancement system, manipulation instructions to instruct the volumetric content playback system to manipulate the annotated volumetric content to achieve a desired emotional state of the viewer, wherein the manipulation instructions are based, at least in part, upon the viewer feedback, the emotional state, and the viewer position information; and
providing, by the volumetric content enhancement system, the manipulation instructions to the volumetric content playback system.

2. The method of claim 1, further comprising:
receiving, by the volumetric content enhancement system, the volumetric from a volumetric content capture system;
partitioning, by the volumetric content enhancement system, the volumetric video into a plurality of video frames;
analyzing, by the volumetric content enhancement system, the plurality of video frames to identify a plurality of voxels;
annotating, by the volumetric content enhancement system, at least a portion of the plurality of voxels with the annotation, wherein the annotation comprises contextual data about the portion of the plurality of voxels; and
determining, by the volumetric content enhancement system, the at least one actionable position within the volumetric video.

3. The method of claim 1, further comprising initializing, by the volumetric content enhancement system, the emotional state of the viewer of the annotated volumetric video.

4. The method of claim 1, wherein the viewer feedback comprises explicit feedback provided by the viewer, passive feedback provided by at least one sensor monitoring the viewer, or the explicit feedback and the passive feedback.

5. The method of claim 1, wherein the portion of the plurality of voxels comprises a region, and wherein the region identifies a character or an object depicted in the volumetric video.

6. The method of claim 1, further comprising generating, by the volumetric content enhancement system, viewer guidance instructions to instruct the viewer to change from the specific actionable position to a different actionable position.

7. The method of claim 1, further comprising:
obtaining, by the volumetric content enhancement system, new viewer feedback associated with the viewer; and
reassessing, by the volumetric content enhancement system, the emotional state of the viewer based, at least in part, the new viewer feedback.

8. A volumetric content enhancement system comprising:
a processor; and
a memory comprising instructions that, when executed by the processor, cause the processor to perform operations comprising
creating an annotated volumetric video comprising a volumetric video, an annotation, and at least one actionable position,
providing the annotated volumetric video to a volumetric content playback system through which a viewer can view the annotated volumetric video,
obtaining viewer feedback associated with a viewer,
determining an emotional state of the viewer based, at least in part, upon the viewer feedback,
receiving viewer position information from the volumetric content playback system, wherein the viewer position information identifies a specific actionable position of the at least one actionable position comprised in the annotated volumetric video,
generating manipulation instructions to instruct the volumetric content playback system to manipulate the annotated volumetric video to achieve a desired emotional state of the viewer, wherein the manipulation instructions are based, at least in part, upon the viewer feedback, the emotional state, and the viewer position information, and
providing the manipulation instructions to the volumetric content playback system.

9. The volumetric content enhancement system of claim 8, wherein the operations further comprise:
receiving the volumetric from a volumetric content capture system;
partitioning the volumetric video into a plurality of video frames;
analyzing the plurality of video frames to identify a plurality of voxels;
annotating at least a portion of the plurality of voxels with the annotation, wherein the annotation comprises contextual data about the portion of the plurality of voxels; and
determining the at least one actionable position within the volumetric video.

10. The volumetric content enhancement system of claim 8, wherein the operations further comprise initializing the emotional state of the viewer of the annotated volumetric video.

11. The volumetric content enhancement system of claim 8, wherein the portion of the plurality of voxels comprises a region, and wherein the region identifies a character or an object depicted in the volumetric video.

12. The volumetric content enhancement system of claim 8, wherein the viewer feedback comprises explicit feedback provided by the viewer, passive feedback provided by at least one sensor monitoring the viewer, or the explicit feedback and the passive feedback.

13. The volumetric content enhancement system of claim 8, wherein the operations further comprise generating viewer guidance instructions to instruct the viewer to change from the specific actionable position to a different actionable position.

14. The volumetric content enhancement system of claim 8, wherein the operations further comprise:
obtaining new viewer feedback associated with the viewer; and
reassessing the emotional state of the viewer based, at least in part, the new viewer feedback.

15. A computer-readable storage medium comprising computer-executable instructions that, when executed by a processor, cause the processor to perform operations comprising:
creating an annotated volumetric video comprising a volumetric video, an annotation, and at least one actionable position;
providing the annotated volumetric video to a volumetric content playback system through which a viewer can view the annotated volumetric video;
obtaining viewer feedback associated with a viewer;
determining an emotional state of the viewer based, at least in part, upon the viewer feedback;
receiving viewer position information from the volumetric content playback system, wherein the viewer position information identifies a specific actionable position of the at least one actionable position comprised in the annotated volumetric video;
generating manipulation instructions to instruct the volumetric content playback system to manipulate the annotated volumetric video to achieve a desired emotional state of the viewer, wherein the manipulation instructions are based, at least in part, upon the viewer feedback, the emotional state, and the viewer position information; and
providing the manipulation instructions to the volumetric content playback system.

16. The computer-readable storage medium of claim 15, wherein the operations further comprise:
receiving the volumetric from a volumetric content capture system;
partitioning the volumetric video into a plurality of video frames;
analyzing the plurality of video frames to identify a plurality of voxels;
annotating at least a portion of the plurality of voxels with the annotation, wherein the annotation comprises contextual data about the portion of the plurality of voxels; and
determining the at least one actionable position within the volumetric video.

17. The computer-readable storage medium of claim 15, wherein the operations further comprise initializing the emotional state of the viewer of the annotated volumetric video.

18. The computer-readable storage medium of claim 15, wherein the viewer feedback comprises explicit feedback provided by the viewer, passive feedback provided by at least one sensor monitoring the viewer, or the explicit feedback and the passive feedback.

19. The computer-readable storage medium of claim 15, wherein the operations further comprise generating viewer guidance instructions to instruct the viewer to change from the specific actionable position to a different actionable position.

20. The computer-readable storage medium of claim 15, wherein the operations further comprise:
- obtaining new viewer feedback associated with the viewer; and
- reassessing the emotional state of the viewer based, at least in part, the new viewer feedback.

* * * * *